(12) United States Patent
Huber et al.

(10) Patent No.: US 8,559,151 B2
(45) Date of Patent: Oct. 15, 2013

(54) ENHANCED CHARGER OVER VOLTAGE PROTECTION FET

(75) Inventors: Ivo Huber, Roehrmoos (DE); Andreas Fees, Pliezhausen (DE)

(73) Assignee: Texas Instruments Deutschland GmbH, Freising (DE)

(*) Notice: Subject to any disclaimer, the term of this patent is extended or adjusted under 35 U.S.C. 154(b) by 284 days.

(21) Appl. No.: 12/480,925

(22) Filed: Jun. 9, 2009

(65) Prior Publication Data

US 2009/0303649 A1 Dec. 10, 2009

Related U.S. Application Data

(60) Provisional application No. 61/141,413, filed on Dec. 30, 2008.

(30) Foreign Application Priority Data

Jun. 9, 2008 (DE) .......................... 10 2008 027 428

(51) Int. Cl.
*H02H 9/02* (2006.01)
(52) U.S. Cl.
USPC ........................................................ 361/93.1
(58) Field of Classification Search
USPC ........................................................ 361/93.1
See application file for complete search history.

(56) References Cited

U.S. PATENT DOCUMENTS

| 5,530,336 | A * | 6/1996 | Eguchi et al. ................. 320/118 |
| 5,583,384 | A * | 12/1996 | Henry .......................... 307/113 |
| 5,789,900 | A * | 8/1998 | Hasegawa et al. ............. 320/132 |
| 5,963,019 | A * | 10/1999 | Cheon ........................... 320/150 |
| 6,130,813 | A * | 10/2000 | Kates et al. .................... 361/93.1 |
| 6,312,610 | B1 * | 11/2001 | Kirker et al. ................... 210/781 |
| 6,316,915 | B1 * | 11/2001 | Fujiwara et al. ............... 320/134 |
| 6,858,922 | B2 * | 2/2005 | Pavier ............................ 257/676 |
| 7,605,565 | B2 * | 10/2009 | Wozniak ........................ 320/134 |
| 7,834,588 | B2 * | 11/2010 | Chang et al. ................... 320/134 |
| 7,884,454 | B2 * | 2/2011 | Lu et al. ......................... 257/676 |
| 7,898,092 | B2 * | 3/2011 | Lu et al. ......................... 257/777 |

(Continued)

FOREIGN PATENT DOCUMENTS

| KR | 2003008610 A | 1/2003 |
| WO | 2006022738 A1 | 3/2006 |

OTHER PUBLICATIONS

Office action issued by Deutsches Patent-und Markenamt, dated Mar. 6, 2009, regarding German application No. 10 2008 027 428.3-34.

*Primary Examiner* — Rexford Barnie
*Assistant Examiner* — Angela Brooks
(74) *Attorney, Agent, or Firm* — William B. Kempler; W. James Brady, III; Frederick J. Telecky, Jr.

(57) ABSTRACT

An integrated battery charger protection circuit incorporates a charge control power FET for series connection in the battery load current path from a DC supply input terminal to a controlled DC output terminal. The circuit has a gate drive input terminal connected to the gate of the charge control power FET and further includes protective circuitry adapted to disable the DC output terminal in a fault condition detected within the integrated circuit. The controlled DC output terminal and the gate drive input terminal are connectable to the external charge control host circuit the same way as corresponding terminals of a discrete power FET, in particular of p-channel type.

20 Claims, 3 Drawing Sheets

(56) References Cited

U.S. PATENT DOCUMENTS

| | | | |
|---|---|---|---|
| 8,046,315 B2 * | 10/2011 | D'Ambrosio | 706/21 |
| 8,179,097 B2 * | 5/2012 | Yun | 320/134 |
| 8,254,070 B2 * | 8/2012 | Arndt et al. | 361/56 |
| 2003/0132732 A1 * | 7/2003 | Thomas et al. | 320/134 |
| 2005/0077878 A1 * | 4/2005 | Carrier et al. | 320/134 |
| 2005/0145946 A1 | 7/2005 | Lee et al. | |
| 2005/0156573 A1 * | 7/2005 | Lin | 320/134 |
| 2005/0168193 A1 | 8/2005 | Xiong et al. | |
| 2005/0269992 A1 * | 12/2005 | Lai et al. | 320/134 |
| 2007/0064362 A1 | 3/2007 | Migliavacca | |
| 2007/0210755 A1 * | 9/2007 | Gangstoe et al. | 320/128 |
| 2008/0002509 A1 * | 1/2008 | You | 365/230.05 |
| 2008/0238320 A1 * | 10/2008 | Kweon | 313/586 |
| 2008/0278116 A1 * | 11/2008 | Matsunaga | 320/134 |
| 2008/0297114 A1 * | 12/2008 | Chang et al. | 320/134 |
| 2008/0310064 A1 * | 12/2008 | Uno | 361/86 |
| 2009/0051315 A1 * | 2/2009 | Wang et al. | 320/113 |
| 2009/0303649 A1 * | 12/2009 | Huber et al. | 361/93.1 |
| 2010/0052614 A1 * | 3/2010 | Mariels | 320/116 |
| 2010/0198032 A1 * | 8/2010 | Simpson et al. | 600/365 |

* cited by examiner

ENHANCED CHARGER OVER VOLTAGE PROTECTION FET

CROSS-REFERENCE TO RELATED APPLICATIONS

This claims priority to German Patent Appl. Ser. No. 10 2008 027 428.3 filed on Jun. 9, 2008. This application also relates to U.S. Patent Application Ser. No. 61/141,413 entitled "ENHANCED CHARGER OVER VOLTAGE PROTECTION FET" filed on Dec. 30, 2008. Each application is hereby incorporated by reference for all purposes.

FIELD OF THE INVENTION

Mobile applications such as phones and other handheld devices or headsets are necessarily equipped with battery charge control circuitry. Over-voltage and over-current protection are requirements for safe use of these devices. Usually the charger path is implemented with one or two discrete power field effect transistors (FETs) of p-channel type driven by a charge control circuit. The maximum over-voltage protection achieved with this solution is about 20V. More recent applications require higher over-voltage protection up to 30V or even 40V and further safety features. This can be achieved with a separate protection circuit paced in front of the discrete power FETs and including a high-voltage FET connected in the charge path. Considerable re-design of existing solutions is however required to incorporate these advanced safety features.

SUMMARY OF THE INVENTION

In accordance with the invention, an integrated battery charger protection circuit is provided which incorporates a charge control power FET for series connection in the battery load current path from a DC supply input terminal to a controlled DC output terminal. The circuit has a gate drive input terminal connected to the gate of the charge control power FET and further includes protective circuitry adapted to disable the DC output terminal in a fault condition detected within the integrated circuit. The controlled DC output terminal and the gate drive input terminal are connectable to the external charge control host circuit the same way as corresponding terminals of a discrete power FET, in particular of p-channel type. Therefore, existing solutions are easily upgraded to higher safety standards with only minor design changes and no changes at all in the charging algorithm and software. In an embodiment, the controlled DC output terminal is adapted for connection to the current sense input of the charge control host circuit, just as a discrete power FET would be conventionally connected to the current sense input of the charge control circuit. Basically, all that is required to incorporate the advanced safety features is to replace the discrete charge control FET or FETs by the inventive integrated battery charger protection circuit.

In an embodiment further safety features are included. Specifically, both the input supply voltage and the battery voltage are permanently monitored. A protective high-voltage power FET is connected in series with the charge control power FET and has its gate connected to a control output of the protective circuitry. Whenever a fault condition is detected, the protective power FET is switched off. The detected fault condition can be either of an input over-voltage condition, an input over-current condition or an excessive die temperature.

An additional feature of an embodiment is the provision of a controlled voltage supply output adapted to be connected to a supply input of the external charge control host circuit. Thus, a separate voltage regulator for the supply of the external charge control host circuit is not required.

The invention can also be implemented as a bi-directional solution with an additional charge control power FET and an additional terminal for connection to the charge control host circuit.

BRIEF DESCRIPTION OF THE DRAWINGS

An exemplary embodiment of the integrated battery charger protection circuit will now be described more in detail with reference to the appending drawings. In the drawings.

DETAILED DESCRIPTION

Figure 1:
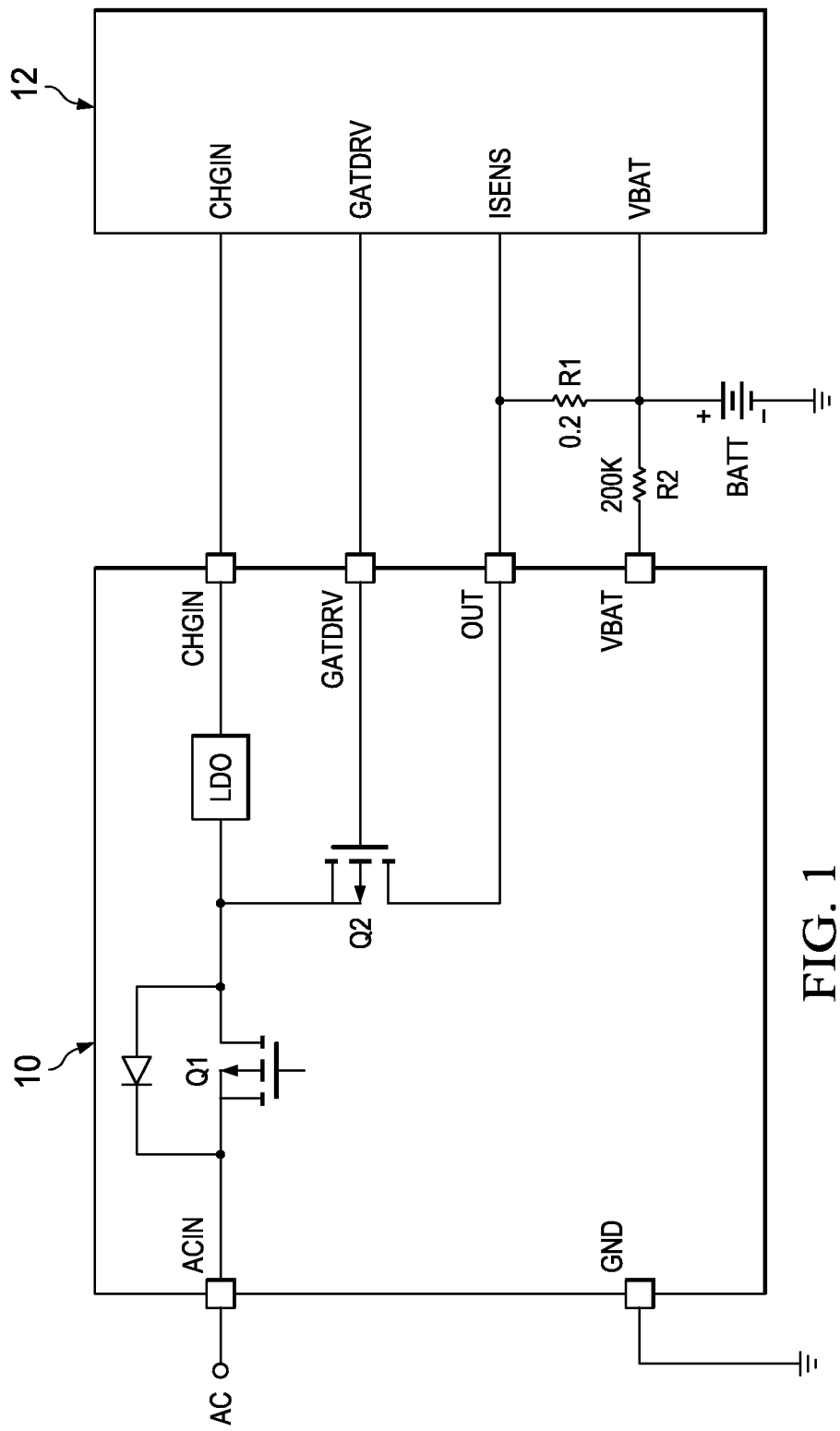
FIG. 1 is a simplified block diagram showing the integrated battery charger protection circuit in a typical application.

With reference first to FIG. 1, an integrated battery charger protection circuit 10 is shown in a typical mobile application such as a smart phone comprising a charge control host circuit 12. On the input side circuit 10 has a DC supply input terminal ACIN and a ground terminal GND. A charge current path runs from terminal ACIN through a protective high voltage power FET Q1 and a charge control power FET Q2 to an output terminal OUT. The gate of FET Q2 is connected to a gate drive input terminal GATDRV. Circuit 10 incorporates a low-drop linear voltage regulator LDO with a supply input connected to the tap between FETs Q1 and Q2 and a regulated voltage output connected to terminal CHGIN. A battery voltage sense terminal VBAT is a further input to circuit 10.

Figure 2:
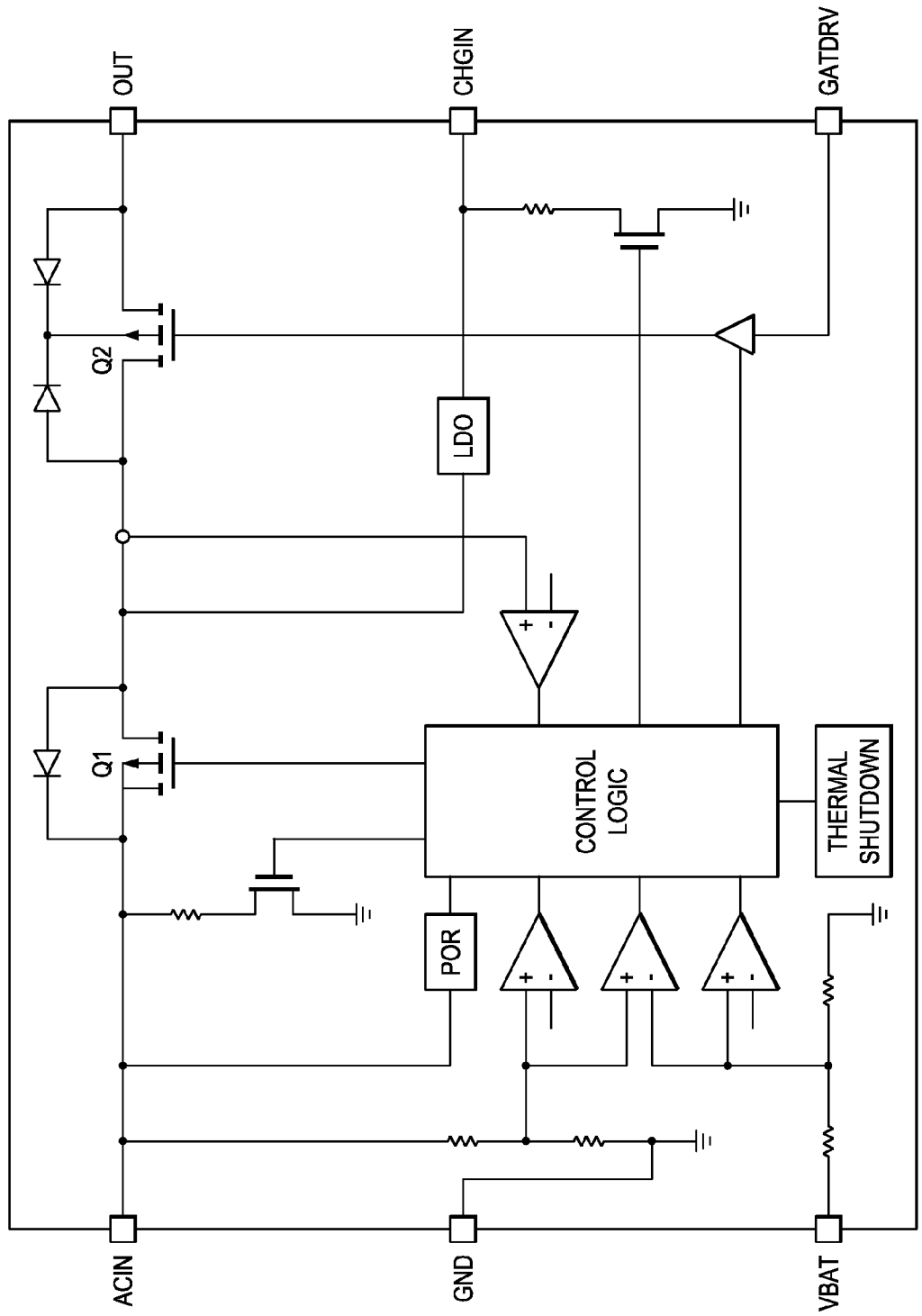
FIG. 2 is a more detailed block diagram of the integrated battery charger protection circuit.

FET Q1 is driven by protective circuitry some details of which are apparent from FIG. 2.

The charge current output terminal OUT of circuit 10 is connected to a chargeable battery BAT through a resistor R1 of small value (e.g. 0.2 Ohm) and to a current sense input ISENS of circuit 12 exactly the same way as if it was connected to an external discrete charge control power FET. In fact, circuit 10 with its internal FET Q2 is "seen" by circuit 12 exactly the same as an external discrete FET of p-channel type. Likewise, circuit 12 supplies a gate drive signal on a terminal GATDRV exactly the same way as if it was intended for an external discrete charge control FET of p-channel type but, in the application shown, terminal GATDRV of circuit 12 is of course connected to terminal GATDRV of circuit 10.

Terminal CHGIN of circuit 10 is connected to a supply terminal CHGIN of circuit 12.

Both circuits 10 and 12 monitor the battery voltage. Terminal VBAT of circuit 10 is connected to the battery BAT through a resistor R2 of relatively high value (e.g. 200 kOhm) and terminal VBAT of circuit 12 is directly connected to the battery BAT.

From FIG. 2 it is seen that the gate of FET Q1 is driven by protective circuitry with a control logic and some comparators which sense the relevant voltages at various internal nodes of circuit 10. The control logic also has an input to a thermal shutdown circuit.

In operation, an external DC supply source AC is connected to terminal ACIN of circuit 10. As long as no fault condition is detected by the control logic, FET Q1 remains in an ON condition. FET Q2 receives an appropriate gate drive signal from circuit 12 which senses the voltage drop across resistor R1 due to the charge current and also senses the battery voltage. The operation of the charge control host circuit 12 is conventional and will not be disclosed further.

In the event of a failure such as an input over-voltage, a battery over-voltage, an over-current or an excessive die temperature of protective circuit 10, the control logic removes the drive signal from the gate of FET Q1, which will be blocked. The protective circuit 10 also provides a reverse current protection (short circuited charger input ACIN).

Figure 3:
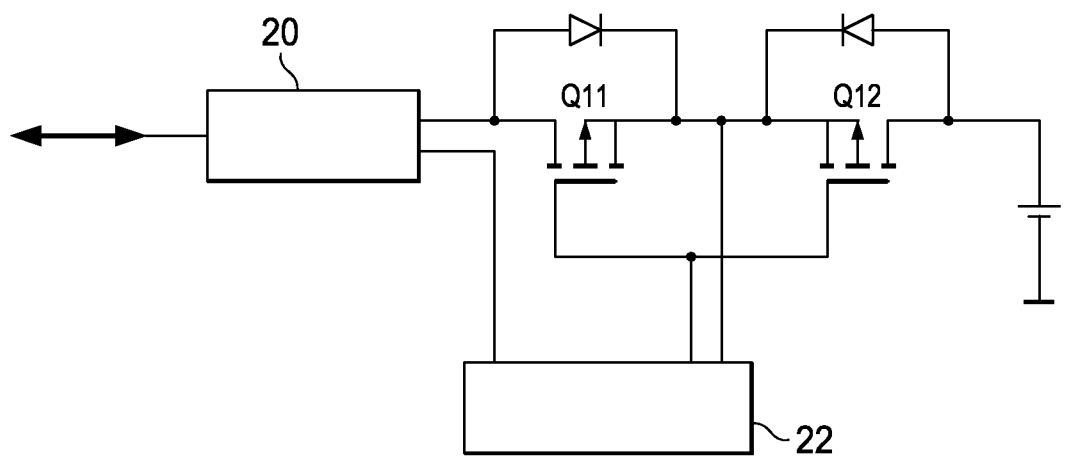
FIG. 3 is a schematic block diagram of a conventional bi-directional charger solution.
Figure 4:
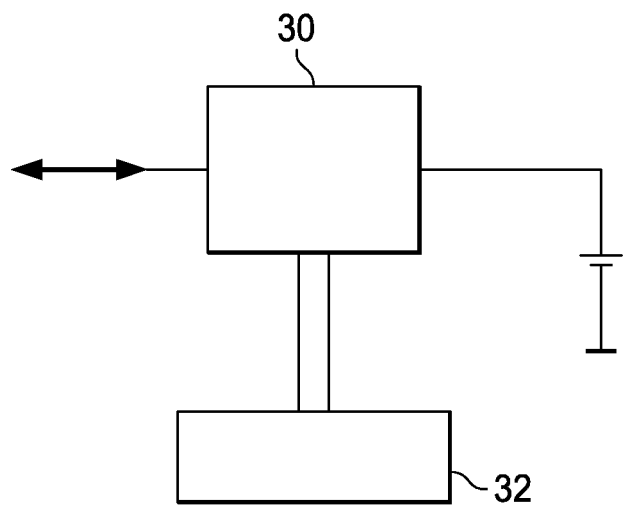
FIG. 4 is a schematic block diagram of an inventive bi-directional charger solution.

The abstract block diagrams in FIGS. 3 and 4 show a conventional bi-directional charger path solution and the inventive bi-directional charger path solution, respectively. The conventional solution uses a protective circuit 20 with an internal high voltage protective FET and a pair of discrete charge control power FETs Q11, Q12 of p-channel type driven by a charge control circuit 22. The bi-directional charge function requires a connection of the charge control circuit 22 to the node between transistors Q11 and Q12. In the inventive solution, FIG. 4, charge control FETs corresponding to the external discrete transistors Q11 and Q12 are incorporated in the integrated charge protection circuit 30, which is "seen" by the charge control circuit 32 exactly as if its internal charge control FETs were the conventional external discrete FETs.

Therefore, existing solutions are easily upgraded to higher safety standards with only minor design changes and no changes at all in the charging algorithm and software.

While the invention has been particularly shown and described with reference to preferred embodiments thereof it is well understood by those skilled in the art that various changes and modifications can be made in the invention without departing from the spirit and scope of the invention as defined by the appended claims.

The invention claimed is:

1. In a battery powered device having a battery charge control circuit for over-voltage and over-current protection for at least one power FET in series with a battery load current path from a DC supply input terminal to a controlled DC output, an integrated circuit replacement for the at least one discrete power FET for providing enhanced protection, comprising:
   a charge control power FET internal to the integrated circuit couplable between a source of DC power and a battery to be charged, the charge control power FET having a gate couplable to a gate drive output of a control host circuit, the control host circuit controlling the charging of the battery;
   a protective circuit for disabling the charge control power FET if a fault condition is detected by the integrated circuit, wherein the control host circuit is coupled to the integrated circuit in the same manner as corresponding terminals of a at least one of the replaced power FETs and wherein the control host circuit controls battery charging using same signals that are usable to control the replaced FETs wherein over voltage and over current protection for the at least one FET is provided.

2. The circuit of claim 1, wherein the charge control host circuit has a current sense input, and a controlled DC output terminal is adapted for connection to the current sense input of the charge control host circuit.

3. The circuit of claim 2, further comprising a battery voltage sense terminal to which an input of the protective circuitry is connected.

4. The circuit according to claim 2, further comprising a protective high voltage power FET connected in series with the charge control power FET and having its gate connected to a control output of the protective circuitry.

5. The circuit according to claim 2, wherein the detected fault condition is one of the group consisting of:
   an input over-voltage condition;
   an input over-current condition;
   an excessive die temperature;
   a battery over-voltage conditions; and
   a reverse current flow conditions.

6. The circuit according to claim 2, and including a controlled voltage supply output adapted to be connected to a supply input of the external charge control host circuit.

7. The circuit according to claim 2, and including a further charge control power FET and a charge path terminal for connection to the charge control host circuit.

8. The circuit of claim 1, further comprising a battery voltage sense terminal to which an input of the protective circuitry is connected.

9. The circuit according to claim 8, further comprising a protective high voltage power FET connected in series with the charge control power FET and having its gate connected to a control output of the protective circuitry.

10. The circuit according to claim 8, wherein the detected fault condition is one of the group consisting of:
    an input over-voltage condition;
    an input over-current condition;
    an excessive die temperature;
    a battery over-voltage conditions; and
    a reverse current flow conditions.

11. The circuit according to claim 8, and including a controlled voltage supply output adapted to be connected to a supply input of the external charge control host circuit.

12. The circuit according to claim 8, and including a further charge control power FET and a charge path terminal for connection to the charge control host circuit.

13. The circuit according to claim 1, further comprising a protective high voltage power FET connected in series with the charge control power FET and having its gate connected to a control output of the protective circuitry.

14. The circuit according to claim 13, wherein the detected fault condition is one of the group consisting of:
    an input over-voltage condition;
    an input over-current condition;
    an excessive die temperature;
    a battery over-voltage conditions; and
    a reverse current flow conditions.

15. The circuit according to claim 13, and including a controlled voltage supply output adapted to be connected to a supply input of the external charge control host circuit.

16. The circuit according to claim 13, and including a further charge control power FET and a charge path terminal for connection to the charge control host circuit.

17. The circuit according to claim 1, wherein the detected fault condition is one of the group consisting of:
    an input over-voltage condition;
    an input over-current condition;
    an excessive die temperature;
    a battery over-voltage conditions; and
    a reverse current flow conditions.

18. The circuit according to claim 17, and including a controlled voltage supply output adapted to be connected to a supply input of the external charge control host circuit.

19. The circuit according to any of claim 1, and including a controlled voltage supply output adapted to be connected to a supply input of the external charge control host circuit.

20. The circuit according to claim 1, and including a further charge control power FET and a charge path terminal for connection to the charge control host circuit.

* * * * *